US011171926B2

(12) United States Patent
Azulay et al.

(10) Patent No.: US 11,171,926 B2
(45) Date of Patent: Nov. 9, 2021

(54) SECURE COMMUNICATION BETWEEN WEB FRAMES

(71) Applicant: Microsoft Technology Licensing, LLC, Redmond, WA (US)

(72) Inventors: Itamar Azulay, Mishmar Ayyalon (IL); Itay Levy, Givatayim (IL); Lucy Goldberg, Hertzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 16/559,741

(22) Filed: Sep. 4, 2019

(65) Prior Publication Data

US 2021/0067494 A1 Mar. 4, 2021

(51) Int. Cl.
*H04L 29/06* (2006.01)

(52) U.S. Cl.
CPC ...... *H04L 63/0281* (2013.01); *H04L 63/1466* (2013.01); *H04L 63/20* (2013.01)

(58) Field of Classification Search
CPC .. H04L 63/0281; H04L 63/1466; H04L 63/20
See application file for complete search history.

(56) References Cited

U.S. PATENT DOCUMENTS 9,106,690 B1 * 8/2015 Banga .................. G06F 16/957
2004/0205149 A1 * 10/2004 Dillon .................. H04L 65/105 709/217
2009/0328063 A1 * 12/2009 Corvera .................. G06F 9/54 719/315
2012/0089481 A1 * 4/2012 Iozzia .................. G06F 21/606 705/26.41
2013/0311863 A1 * 11/2013 Gutkin ................ G06F 16/9566 715/208
2014/0189498 A1 * 7/2014 Liverant .............. G06F 40/143 715/234

(Continued)

OTHER PUBLICATIONS

"Web Messaging", retrieved from <<https://en.wikipedia.org/wiki/Web_Messaging>>, Sep. 18, 2017, 4 pages.

(Continued)

*Primary Examiner* — Vance M Little
(74) *Attorney, Agent, or Firm* — Ogilvie Law Firm

(57) ABSTRACT

Communication between web frames increases consistent application of security policies, without reducing security. A proxy receives a first request implicating a first web frame and its URL, potentially issues a sub-request and gets a sub-response, and creates a first response to the first request, including a control frame child creation in frame creation or frame navigation code. The control frame child code only permits setting and retrieving data of a browser store, using postMessage( ) without reference to external resources or external scripts. Safely sharing message data this way between frames allows the proxy to ascertain a policy based on the shared data, so the proxy and browser can apply the policy in reactions to subsequent requests, allows window frames to be associated together in the proxy, allows initialization control, supports reporting, and otherwise enhances browsing without reducing security.

20 Claims, 5 Drawing Sheets

400
REQUESTOR 402, E.G., BROWSER 200
OUTER/TOP FRAME 204 WITH FIRST URL 602 AND IS-TOP PARAMETER 422
INNER FRAME AA 204 WITH SECOND URL 602
CONTROL FRAME CHILD 424 OF AA, WITH CONTROL FRAME CODE 426 AND DOMAIN 602
INNER FRAME BB 204 WITH THIRD URL 602
CONTROL FRAME CHILD 424 OF BB, WITH CONTROL FRAME CODE 426 AND DOMAIN 602
DOCUMENT OBJECT MODEL (DOM) 404 FOR WEB PAGE 212
REQUESTS 406
RESPONSES 408 WITH CONTENT 420 & CREATION 410
REVERSE PROXY SERVICE 206, 312
CROSS-FRAME COMMUNICATION CODE 412
POLICY 414 FOR FIRST URL
POLICY 414 FOR SECOND URL
SUB-REQUEST 416
SUB-REQUEST 416
SUB-RESPONSE 418
SUB-RESPONSE 418
WEB SERVER 208 FIRST URL 602
WEB PAGE 212 CONTENT 214
WEB SERVER 208 SECOND URL 602
WEB PAGE 212 CONTENT 214

(56) References Cited

U.S. PATENT DOCUMENTS

| | | | | |
|---|---|---|---|---|
| 2015/0143223 | A1* | 5/2015 | Kolam | G06F 9/54 715/234 |
| 2018/0013848 | A1* | 1/2018 | Schejter | G06F 16/9535 |
| 2018/0205705 | A1* | 7/2018 | Kupferschmied | H04L 67/146 |
| 2018/0367572 | A1* | 12/2018 | Frisbie | G06F 21/53 |
| 2021/0006544 | A1* | 1/2021 | Lewin | H04L 63/20 |

OTHER PUBLICATIONS

"HTML element", retrieved from <<https://en.wikipedia.org/wiki/HTML_element>>, May 29, 2019, 39 pages.

"Framing (World Wide Web)", retrieved from <<https://en.wikipedia.org/wiki/Framing_(World_Wide_Web)>>, Feb. 27, 2019, 5 pages.

"Framekiller", retrieved from <<https://en.wikipedia.org/wiki/Framekiller>>, Mar. 15, 2019, 3 pages.

"Proxy server", retrieved from <<https://en.wikipedia.org/wiki/Proxy_server>>, May 26, 2019, 11 pages.

"Document Object Model", retrieved from <<https://en.wikipedia.org/wiki/Document_Object_Model>>, May 11, 2019, 4 pages.

Mark Lieberman, "Foxy Gestures", retrieved from <<https://addons.mozilla.org/en-US/firefox/addon/foxy-gestures/>>, Nov. 3, 2018, 11 pages.

Mark Lieberman, "foxygestures", retrieved from <<https://github.com/marklieberman/foxygestures/blob/master/src/content/mouseEvents.js>>, no later than May 31, 2019, 21 pages.

"Same-origin policy", retrieved from <<https://en.wikipedia.org/wiki/Same-origin_policy>>, May 29, 2019, 6 pages.

"Same-origin policy", retrieved from <<https://developer.mozilla.org/en-US/docs/Web/Security/Same-origin_policy>>, no later than May 31, 2019, 7 pages.

"DOM events", retrieved from <<https://en.wikipedia.org/wiki/DOM_events>>, Jan. 6, 2019, 22 pages.

"Query string", retrieved from <<https://en.wikipedia.org/wiki/Query_string>>, Jun. 10, 2019, 6 pages.

"ECMAScript", retrieved from <<https://en.wikipedia.org/wiki/ECMAScript>>, Jun. 13, 2019, 10 pages.

"Document.domain", retrieved from <<https://developer.mozilla.org/en-US/docs/Web/API/Document/domain>>, Mar. 18, 2019, 5 pages.

U.S. Appl. No. 16/502,093, filed Jul.3, 2019 Guy Lewin, et al.

* cited by examiner

SECURE COMMUNICATION BETWEEN WEB FRAMES

BACKGROUND

The World Wide Web includes text documents, images, videos, and other digital resources which are linked to one another by hyperlinks, and which are accessed over the Internet using a software application called a "web browser". The World Wide Web is often referred to simply as the "Web" or "the web". Web browsers are often referred to simply as "browsers", or referred to by their respective product names, e.g., Chrome®, Safari®, Firefox®, Opera®, IE™ or Internet Explorer®, Microsoft Edge®, and so on (marks respectively of Google, LLC; Apple, Inc.; Mozilla Foundation; Opera Software; Microsoft Corporation).

In its requests, a browser identifies the requested information using Uniform Resource Locators (URLs). The URL typically specifies a domain, e.g., "uspto.gov" or "microsoft.com", a file path and filename within the domain, and a communication protocol such as Hypertext Transfer Protocol (HTTP) or Hypertext Transfer Protocol Secure (HTTPS). With the aid of web servers and other infrastructure, the browser retrieves the identified information from the specified storage location on a web server that serves the specified domain, using the specified protocol. Text, images, and videos retrieved by the browser are then displayed on a user device's screen. The user's device may be a smartphone, a tablet, a computer workstation, or a laptop, for example.

Different items of information retrieved by a web browser may be displayed together as a single web page, even though each item has its own respective URL. Sometimes items with different URLs are displayed in different frames of a web page. Frames may be defined using web page languages such as Hypertext Markup Language (HTML). Items displayed in different frames may come from web servers at different domains. Those web servers are not necessarily informed that their respective served contents are being presented together to a user as part of a single web page. Accordingly, there may be inconsistencies or conflicts between the policies that are meant to govern the respective contents of different frames of a given web page within a browser.

SUMMARY

Communications between frames allows the detection and resolution of inconsistencies or conflicts between the policies that are meant to govern the respective contents of different frames of a given web page within a browser. Some embodiments presented herein use or perform operations that enhance cross-frame communication security by allowing frames of a web page to share domain identifications or other data without relying on external resources or external scripts that may be compromised or malicious.

In some embodiments, a proxy helps web frames of a page securely communicate with one another. The proxy receives from a requestor a request which implicates a web frame of the page. The proxy creates a response to the request, and includes or otherwise adds a control frame creation to the response. The control frame creation is configured to create a control frame child of the web frame; the control frame child is configured to set and retrieve data of a browser data store. The proxy returns to the requestor the response, including the control frame creation. This sequence is repeated, by including control frame creations in one or more other responses to respective other requests which implicate respective other web frames, such that a plurality of web frames of the page each has a respective control frame child. In this way, the plurality of web frames of the page are configured for cross-frame communication with one another using message data that is set in the browser data store by one of the web frames and retrieved from the browser data store by another of the web frames. Thus, the security of communications between web frames of the plurality is enhanced, in that each control frame child is free of any dependency on any potentially malicious or compromised external resource and is also free of any call to any potentially malicious or compromised external script.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
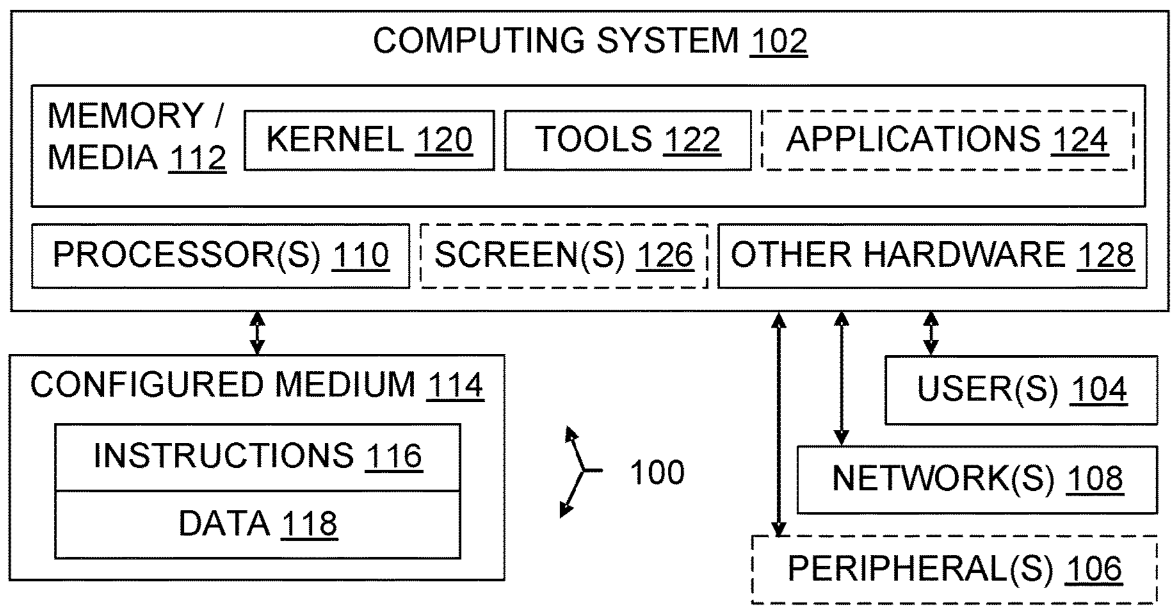
FIG. 1 is a block diagram illustrating computer systems generally and also illustrating configured storage media generally.

Many innovations expand beyond their origins, but understanding an innovation's origins can help one more fully appreciate the innovation. In the present case, some teachings described herein were motivated by technical challenges of attributing web activities to applications, e.g., in order to apply security policies of a domain of a top frame (a.k.a. "outer frame") to all inner frames. In particular, a challenge was to how to apply security policies consistently within a web page of a SharePoint® website (mark of Microsoft Corporation) without risking content loads from unknown and possibly malicious websites as inner frames are loaded. However, one of skill will recognize that the teachings provided herein have beneficial applicability to many other technical configurations as well.

Web pages displayed to users are often built from multiple frames, in effect containing several different pages in one window. From a user perspective, this window is often perceived as a single web page, and it may be discussed as such herein, with the understanding that one of skill may consider it to be more precisely described as a window containing individual constituent pages which are defined using web frames. The aggregation or agglomeration of content from different domains into respective web frames can be achieved using an <iframe> HTML tag, or a legacy <frame> HTML tag, or Google's recently announced <portal> tag, for example. Proxy servers (both forward and reverse proxies) can modify the content of any or all of these constituent pages, that is, the content of the constituent web frames.

Sometimes it is desirable to share information between frames. For example, Microsoft Cloud App Security™ services and other security solutions may apply different security precautions or constraints depending on which application is associated with a top-level domain of a window. Thus, data may be shared between frames in order to associate the right application across the window, thereby giving a product better accuracy for events and policies configured by a client.

Some embodiments disclosed herein catch frame creations, at all of the places a new frame is created, e.g., in HTML and in JavaScript® and other ECMAScript implementations (mark of Oracle America, Inc.). In addition, some embodiments catch all the inner frame address changes in such places. In all of these cases, a control frame child is added to non-control frames to safely pass messages between the frames in the window. Using this technology, message data can be passed between frames without exposing a framed web page to security issues created by other approaches, as discussed herein.

In particular, one alternative approach uses a frame's postMessage( ) function in order to pass arbitrary messages directly between frames. This is problematic in some proxied solutions, because conventional unconstrained usage of postMessage( ) creates new DOM elements or events that may reference external compromised or malicious items. Creating new DOM elements or events inside a page that one does not fully control may (and from experience, sometimes does) lead to breaking the web page.

The innovative technology disclosed herein is more secure than using postMessage( ) for direct inter-frame communication of arbitrary messages, and doesn't need to involve a frame's renderer parsing any content from frames that are unknown to the designer of the original framed content. Some embodiments affect the DOM structure only in ways that are constrained to maintain page security, which helps these embodiments avoid breaking any web page. Some embodiments herein are more secure than alternatives because these embodiments avoid parsing any request or response from unknown web pages.

One of skill will acknowledge that many browsers enforce a same-origin policy. Under this policy, a browser allows scripts in a web page A to access content of a web page B only if both web pages have the same origin. The origin of a web page is the web page's URI scheme (e.g., HTTP or HTTPS), host name (e.g., domain name), and port number. A goal of the same-origin policy enforcement is to prevent a malicious script on one web page from accessing sensitive data on another web page. A work-around sometimes used is to append the same domain name to communications to and from different web pages, so they appear to have the same origin even though they actually originated from different domains. Such a work-around downgrades the security of a solution by overriding policies that would otherwise govern access. Some embodiments herein are more secure than alternatives that use this work-around, because these embodiments avoid changing the DOM sharing top domain in order to share top domain with all other frames.

Some embodiments described herein may be viewed by some people in a broader context. For instance, concepts such as communication, external, parent, proxy, request, and response, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to communicate domain identifications and other data between web frames without invoking external resources or external scripts. Other configured storage media, systems, and processes which involve ideas such as communication, external, parent, proxy, request, or response are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular requests, responses, URLs, operating systems, software development environments, programming languages, markup languages, HTML code, tags, software processes, development tools, identifiers, files, data structures, notations, control flows, pseudocode, naming conventions, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as communications between a proxy and other devices in a computer network, web frame creation, navigation to different domains under the Internet Domain Name System, identification and enforcement of security policies to control access to digital data, and web browsing, which are each activities deeply rooted in computing technology. Some of the technical mechanisms discussed include, e.g., control frames, creation of control frames as child frames, domain names, markup languages, proxies, and browsers. Some of the technical effects discussed include, e.g., transmission of message data between web frames, constrained use of postMessage( ) for cross-frame communication, and avoidance of suffixed shared domains to work around enforcement of the same-origin policy. Thus, purely mental processes are clearly excluded. Some embodiments improve the functioning of computing systems by securely communicating message data between frames of a given window, and increasing policy enforcement consistency by allowing a proxy to associate otherwise disjoint requests and enforce a policy across multiple (or all) frames of a window. Other advantages based on the technical characteristics of the teachings will also be apparent to one of skill from the description provided.

Note Regarding Hyperlinks

This disclosure may contain various URIs, hyperlinks, IP addresses, and/or other items which might be considered browser-executable codes. These items are included in the disclosure merely as a courtesy, rather than being included to reference the contents of the web sites or files that they identify as necessary support for the description of embodiments. Applicant does not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01(VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTML: hypertext markup language
HTTP: hypertext transfer protocol
HTTPS: hypertext transfer protocol secure
IaaS or IAAS: infrastructure-as-a-service
ID: identification or identity
IoT: internet of things
IP: internet protocol
LAN: local area network
MITM: man in the middle; refers to a device interposed between other devices in a communication path between those other devices
OS: operating system
PaaS or PAAS: platform-as-a-service
RAM: random access memory
ROM: read only memory
SIEM: security information and event management; also short for "SIEM tool"
UEFI: Unified Extensible Firmware Interface
URI: uniform resource identifier
URL: uniform resource locator
VM: virtual machine
WAN: wide area network

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Proxy operations such as issuing requests and sub-requests, getting responses and sub-responses, creating responses, creating a control frame as a child of a non-control frame, and many other operations discussed, are understood herein as inherently digital. A human mind cannot interface directly with a CPU or other processor, or with RAM or other digital storage, to read and write the necessary data to perform the cross-frame communication steps taught herein. This would all be well understood by persons of skill in the art in view of the present disclosure, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

Qualifiers such as "first", "second", and so on are used herein to indicate respective items, which may or may not have the same value; they are not used to indicate any particular position in an ordered list of items. When an item is assumed or known to occupy a first-in-the-ordinal-sense position (so far as relevant items are concerned), then the term "initial" will be used as a qualifier. Thus, a "first request" does not necessarily occupy the initial or lead position in a chronological or otherwise ordered list of requests. Also, a first request and a second request are different items, but they do not necessarily have different values; they may each recite the same text, or their respective texts may differ in some way. Also, even when a "second" action occurs or has relevance at a later time than a "first" action, there may be intervening actions. Thus, although a relevant sequence of actions could include a "first request" followed by a "first response" followed by a "second request" followed by a "second response", with no intervening requests or responses, in another situation a relevant sequence of actions could instead include a "first request" followed by a "first response" followed by an intervening request X followed by a "second request" followed by an intervening response Y followed by a "second response", as just one of many possibilities.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, associating, attributing, blocking, checking, communicating, creating, generating, initializing, loading, performing, providing, reacting, receiving, reporting, retrieving, returning, sending, setting, supporting, using, utilizing (and adds, added, associates, associated, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment

102 computer system, also referred to as computational system or computing system

104 users

106 peripherals

108 network generally, including, e.g., LANs, WANs, software defined networks, clouds, and other wired or wireless networks

110 processor

112 computer-readable storage medium, e.g., RAM, hard disks

114 removable configured computer-readable storage medium

116 instructions executable with processor; may be on removable storage media or in other memory (volatile or non-volatile or both)

118 data

120 kernel(s), e.g., operating system(s), BIOS, UEFI, device drivers

122 tools, e.g., anti-virus software, firewalls, packet sniffer software, intrusion detection systems, intrusion prevention systems, debuggers, profilers, compilers, interpreters, decompilers, assemblers, disassemblers, source code editors, simulators, fuzzers, repository access tools, version control tools, optimizers, collaboration tools, software development tools and tool suites, hardware development tools and tool suites, diagnostics, and so on

124 applications, e.g., word processors, web browsers, spreadsheets, games, email tools

126 display screens, also referred to as "displays"

128 computing hardware not otherwise associated with a reference number 106, 108, 110, 112, 114

200 web browser

202 window containing one or more web frames

204 web frame

206 proxy; may also be referred to as "proxy server", "proxy service", or "proxy device"; includes hardware and software; may be implemented using stand-alone appliances, virtual machines, containers, or code in applications or kernels, for example; unless indicated otherwise, "proxy" refers to both forward proxies and reverse proxies

208 web server; may also be referred to as "web service", or "website", includes hardware and software

210 domain; may also be referred to as "domain name"

212 web page

214 content for web page, e.g., HTML, scripts, images, videos, sound files

216 browser data store

218 message data; this is a particular kind of data 118

300 aspects of a proxy or a proxy environment

302 cloud; may also be referred to as "cloud computing environment"

304 virtual machine, e.g., a computing construct which provides hardware virtualization and includes an operating system

306 container, e.g., a computing construct which provides user space virtualization and does not itself include an operating system but is nonetheless reliant upon an operating system to execute

308 log, e.g., syslog file, event file, or other record of events

310 forward proxy; this is a proxy 206 which is typically located close to clients (end user machines). The forward proxy receives client requests for access to a server such as a web server, and then the forward proxy makes corresponding requests to the actual servers. The client knows the identity of the server but does not necessarily know about the forward proxy; the forward proxy is often transparent to the client.

312 reverse proxy; this is a proxy 206 which is typically located close to servers, e.g., web servers. To clients or end users, the reverse proxy appears to be a server. The reverse proxy receives client requests as if the proxy were the server targeted by the requests and then the reverse proxy makes corresponding requests to servers. The client knows the identity of the reverse proxy in the apparent role of server, e.g., web server, but the client does not usually know about the reverse proxy's communications with the actual web server.

314 debugger; a software development tool

316 profiler; a software development tool

318 SIEM tool; a cybersecurity tool

320 HTML; may refer to the markup language itself, to capabilities associated with the markup language, or to code written using the markup language, e.g., to web page source code

322 postmessage routine; may also be referred to using different capitalizations; may also be referred to as "postMessage( )" where the "0" indicates a routine; although the identifier "postMessage" is widely used, reference numeral 322 and "postMessage" (in any capitalization) also refer to any web messaging or cross-document messaging routine however named that allows web pages (a.k.a. "documents") of different origins (in the same-origin policy sense) to communicate with one another while rendered or rendering in a web browser

324 an elapsed time; the start time and end time at the endpoints of an interval which has the elapsed time as its duration will be clear from surrounding text or drawing(s); the elapsed time may be in microseconds, CPU cycles, system ticks, or another unit of time

400 computing system configured with cross-frame communication functionality; may also be viewed as a particular computing system 102 or a particular computing environment 100

402 requestor

404 document object model (DOM)

406 request, e.g., web page content request

408 response to a request 406

410 web frame creation code or invocation thereof

412 cross-frame communication code; includes software which performs cross-frame communication operations described herein

414 policy, e.g., a security policy which governs some aspect of digital data or computing resource confidentiality, availability, or integrity

416 sub-request; may also be viewed as a continuation or development or successor of a request 406 and as a request 406 in its own right

418 sub-response; may also be viewed as a precursor or fodder or basis of a response 408 and as a response 408 in its own right

420 response content

422 parameter indicating whether a particular frame is the top frame

424 control frame child; an example of a frame 204; also referred to as "child frame"

426 code of control frame child; also referred to as "safe code" or "control frame code"

502 user interface; may include one or more of a command line interface, a graphical user interface (GUI) or an application program interface (API), for example

600 aspects of message data 218

602 uniform resource locator (URL)

604 identification (e.g., domain name) of a domain; may be, e.g., an identification of a governing domain (which may also referred to as a "top domain" or as domain of "outer frame") whose policy should govern an inner frame's web page content

606 app data; also referred to as "application data"

608 timestamp; time may be measured in microseconds, CPU cycles, system ticks, or another unit of time

610 overall web page or window identifier generated by a proxy

612 size (e.g., in bytes) of message data

700 aspects of a document object model (DOM)

702 DOM tree

704 DOM tree node

706 DOM event

708 DOM event handler

710 DOM element

Figure 8:
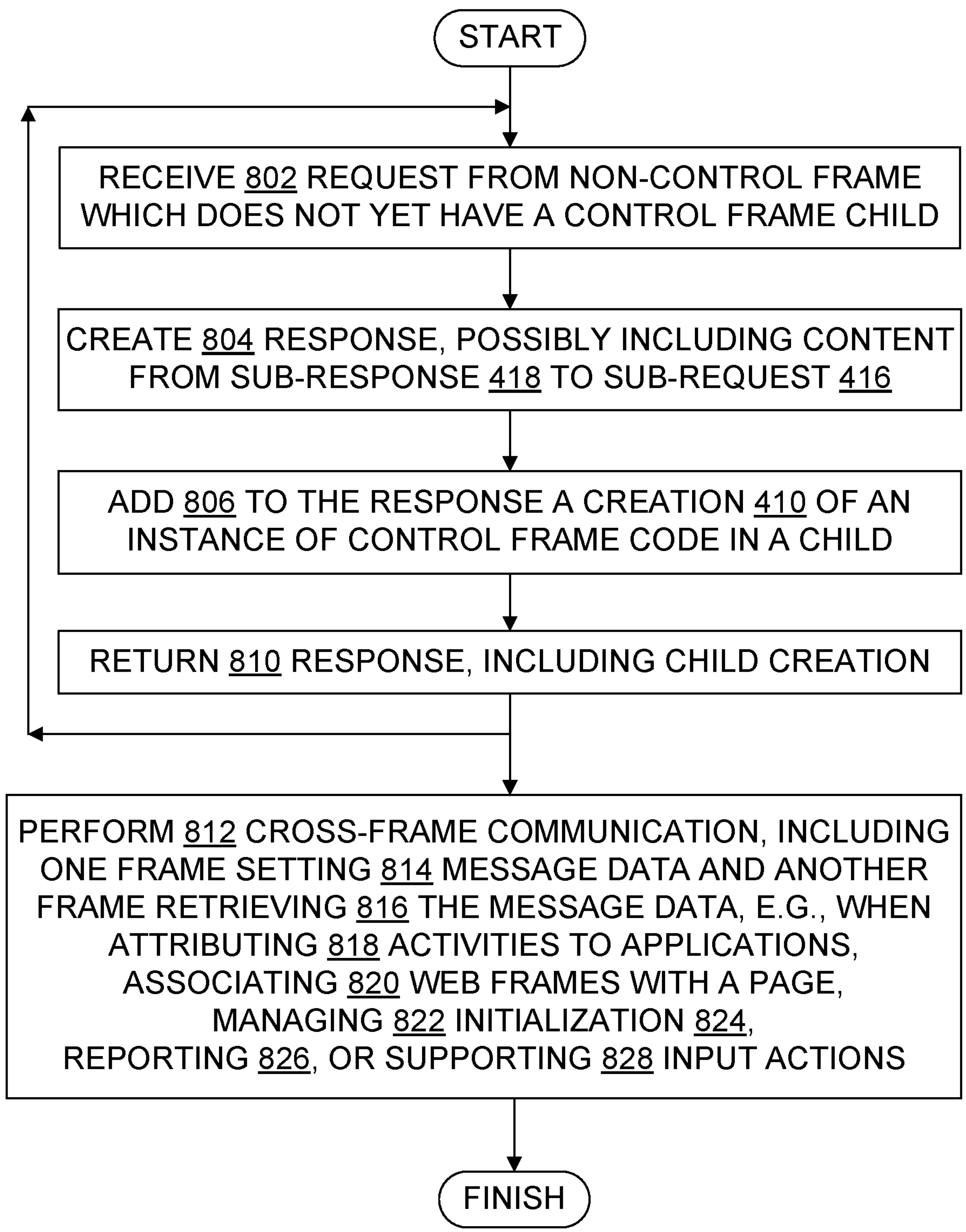
FIG. 8 is a flowchart illustrating steps in some cross-frame communication methods.

800 cross-frame communication flowchart; 800 also refers to cross-frame communication methods illustrated by or consistent with the FIG. 8 flowchart, and to the actions of cross-frame communication (or the actions of facilitating such cross-frame communication) using such a method

802 receive a request 406 implicating a web frame, e.g., a navigation request to change a URL associated with the web frame, or a load request to obtain web page content to be displayed in the web frame

804 create a response 408 to a request 406

806 add control frame creation 410 to a response 408; although given a separate reference numeral for emphasis, adding control frame creation 410 may be integral to creating the response, or adding 806 may be a separate step performed after creating 804 the response

810 return a response; as used herein, "return" is interchangeable with "send" in that returning 810 a response to a browser does not require previously receiving that response from the browser

812 perform cross-frame communication action(s), e.g., in proxy or browser or both

814 set message data, e.g., write message data to the browser data store

816 retrieve message data, e.g., read message data from the browser data store

818 attribute activity to an application

820 associate web frames with a page, e.g., create a list of web frames that belong to the same window as one another

822 manage initialization of a web frame

824 initialization of a web frame

826 report an action or status or error

828 support an input action

Figure 9:
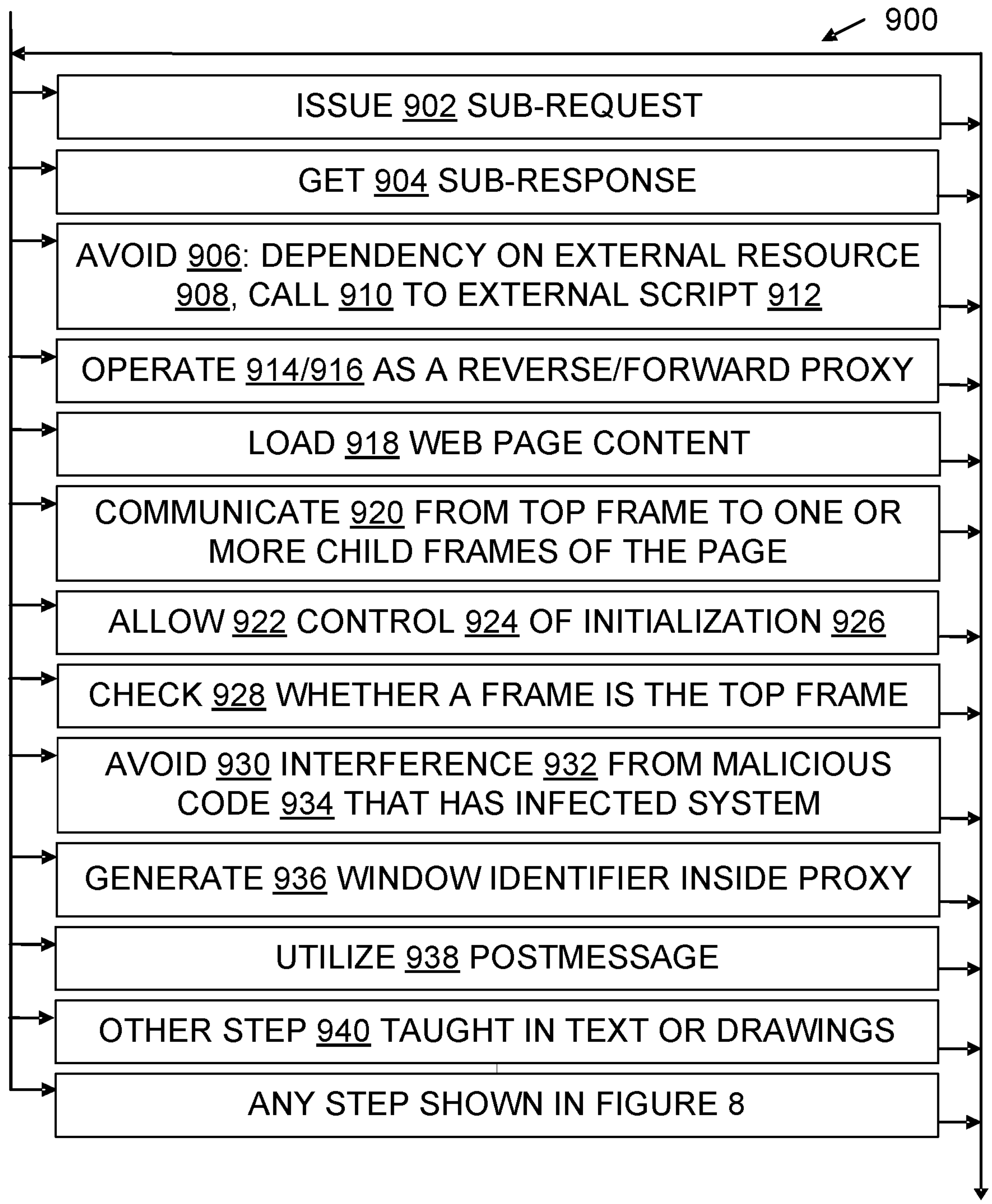
FIG. 9 is a flowchart further illustrating steps in some cross-frame communication methods.

900 flowchart; 900 also refers to cross-frame communication methods illustrated by or consistent with the FIG. 9 flowchart (which incorporates the steps of FIG. 8)

902 issue (e.g., send) a sub-request

904 get (e.g., receive) a sub-response

906 avoid dependency on an external resource (e.g., file or blob) or avoid making call to an external script, or do both; "external" means in a file or the like outside the code of the control frame, and does not cover system code or browser code or standard library code

908 external resource

910 call to an external script

912 external script

914 operate as a reverse proxy

916 operate as a forward proxy

918 load web page content, or send web page content for subsequent loading

920 communicate from the top frame to one or more inner frames

922 allow control of frame initialization

924 control of frame initialization

926 frame initialization

928 check whether a frame is the top frame

930 avoid interference from malicious code

932 interference from malicious code, e.g., performance of unauthorized actions, hijacking, data tampering, privacy or security violation

934 malicious code

936 generate a window identifier 610

938 utilize (e.g., invoke execution of, or be altered through execution of) a PostMessage routine 322

940 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud.

An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
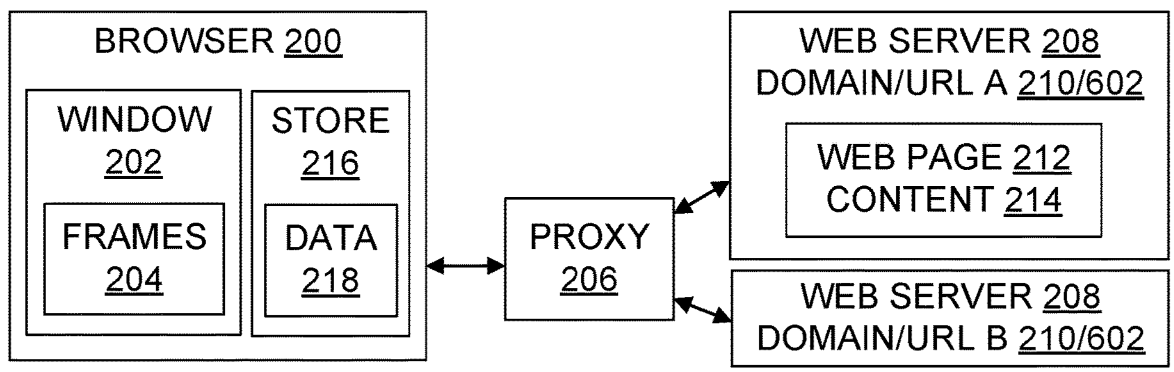
FIG. 2 is a block diagram illustrating an environment which includes a browser, a proxy, and some web servers.

With reference to FIGS. 1 through 7, some embodiments use or provide a functionality-enhanced system 206. The functionality enhancement promotes cybersecurity by facilitating communication between web frames while avoiding some conventional risky approaches to communication. As shown in the example of FIG. 2, a web browser 200 has a window 202 which a user may perceive as a single web page 212 but which actually contains two or more web frames 204. The browser also has a data store 216, which is used in some embodiments to hold message data 218 being communicated between web frames 204; the browser store 216 may also hold other data.

In this example, the browser requests web page content 214 from web servers 208 which serve one or more URLs 602. These URLs may include some or all different domains 210, or all have the same domain 210; an embodiment's ability to associate 820 frames with one another as parts of a given window may be employed even when associated frames have the same domain 210. A proxy 206 is in the communication path between the browser 200 and the web servers 208. The proxy 206 facilitates sharing message data, such as URL 602 or URL domain 210 identifications, between the web frames 204. The web frame data sharing facilitated by the proxy 206 supports applications of one domain's policy 414 or one URL's policy 414 to the contents 214 of other domains or other URLs, for example. Although not shown in FIG. 2 or 4, other devices may reside between the browser 200 and the proxy 206, or between the proxy 206 and a web server 208, such as gateways, switches, routers, firewalls, or even other proxies 206.

Figure 3:
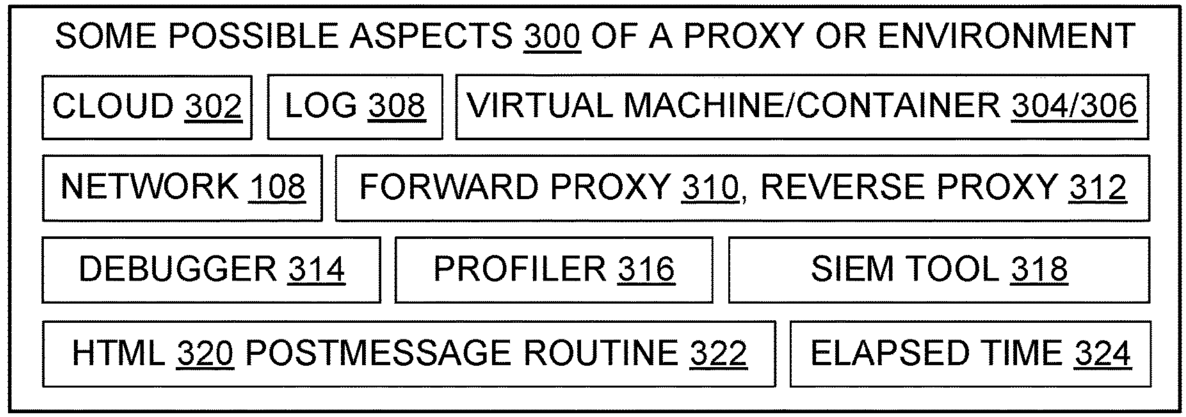
FIG. 3 is a block diagram illustrating some aspects of some proxies and some aspects of some proxy environments.

FIG. 3 shows some additional aspects 300 of the proxy 206 and its environment, which are discussed at various points throughout this disclosure.

Figure 4:
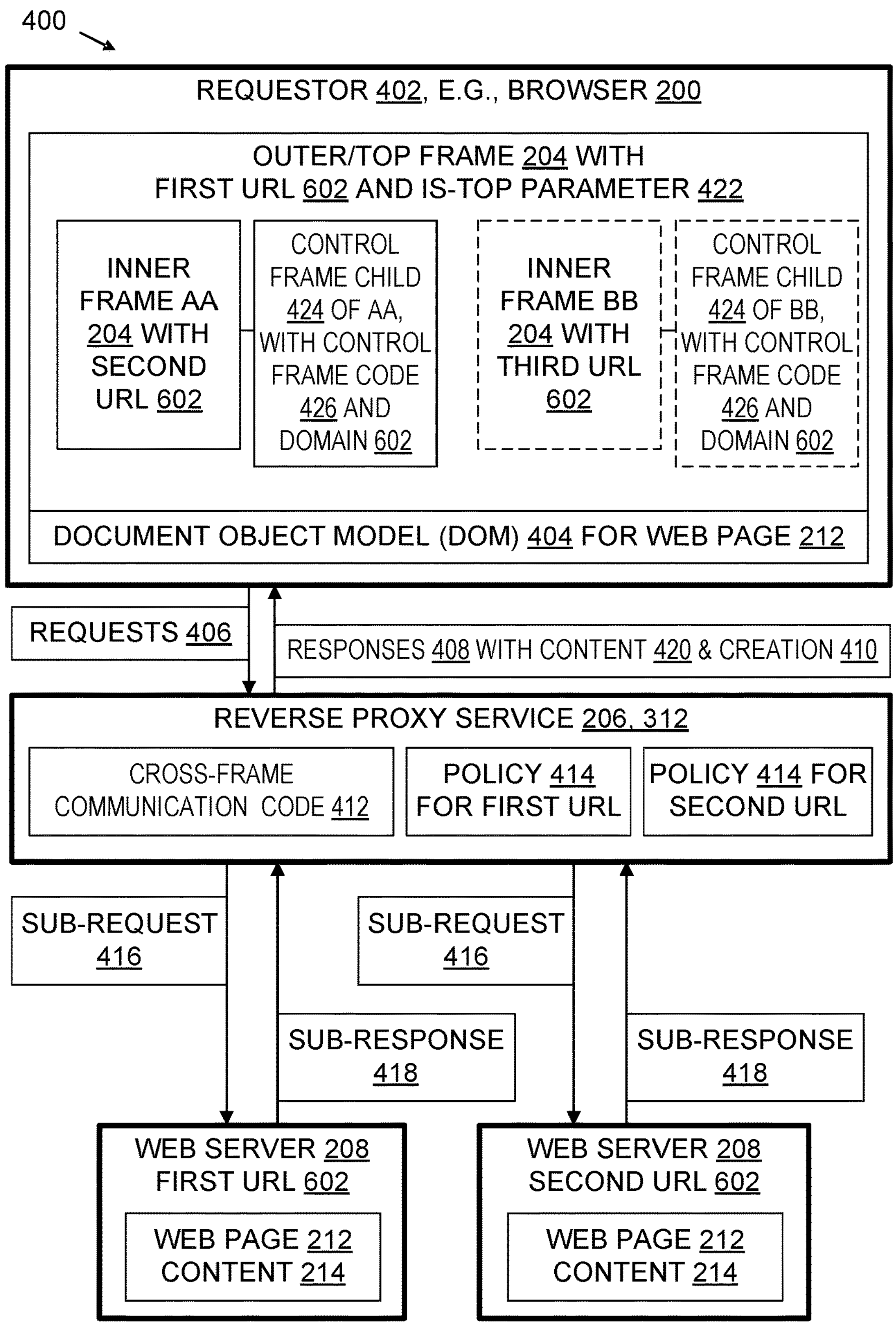
FIG. 4 is a data flow diagram illustrating aspects of a system which is configured with cross-frame communication functionality.

FIG. 4 shows an expanded example which is consistent with FIG. 2. The browser 200 or another requestor 402 has a window with an outer frame 204 and one or more inner frames 204; a per-frame Boolean or other parameter 422 may be used to indicate whether a given frame is the top (outermost) frame. The frames 204 have respective URLs 602 in this example. One of skill will recognize that frames and URLs or domains may be mapped in various ways, e.g., multiple frames 204 may include content from the same domain, and a given frame may include content from different domains at different points in time.

Figure 7:
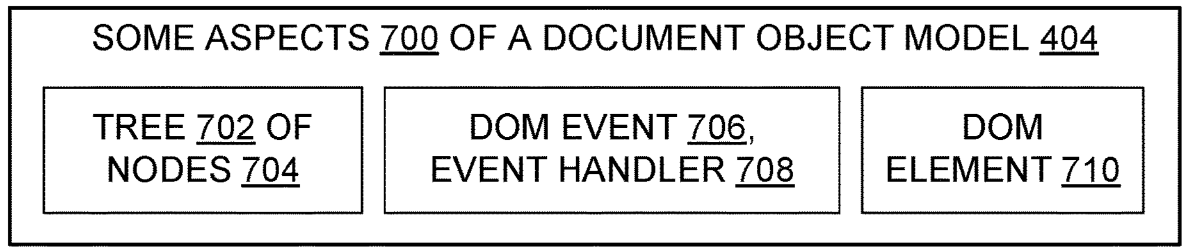
FIG. 7 is a block diagram illustrating some aspects of a document object model (DOM)

In the FIG. 4 example, the browser 200 also includes or accesses one or more document object models 404. FIG. 7 shows some aspects 700 of DOMs 404. A DOM is a data structure which includes a tree 702 of nodes. Nodes 704 include or represent events 706 and page elements 710. Events 706 have associated event handlers 708. Conventional DOMs 404 are suitable for use in environments 400; such environments also include innovative enhancements to web frame communication functionality as taught herein.

In the FIG. 4 example, the requestor 402 sends requests 406 toward the web servers 208. However, the proxy 206 intercepts the requests 406. The proxy may react to a request 406 in various ways: the request may effectively be forwarded in the form of a sub-request 416, or the request may be responded to without forwarding by using data cached in the proxy 206, or the request may be denied as a result of applying a policy 414, for example. Sub-requests 416 from the proxy to a web server lead to corresponding sub-responses from the web server to the proxy. Sub-response 418 content may then be put in a response 408 that is sent to the requestor 402 from the proxy. The response 408 includes web frame creation instructions 410, 116, which are included in the response by execution of cross-frame communication code 412. Upon execution in a browser, the creation instructions 410 create a control frame 424, 204 as a child of a non-control frame. The control frame child 424 has code 426 which allows the control frame child 424 to act as a secure intermediary in cross-frame communications. The code 426 is constrained so it will only set data 218 in the browser store 216 or read data 218 from the browser store 216; the child control code 426 will not invoke external resources or external scripts or otherwise open its parent frame to interference from potentially malicious or compromised code outside the parent.

Figure 5:
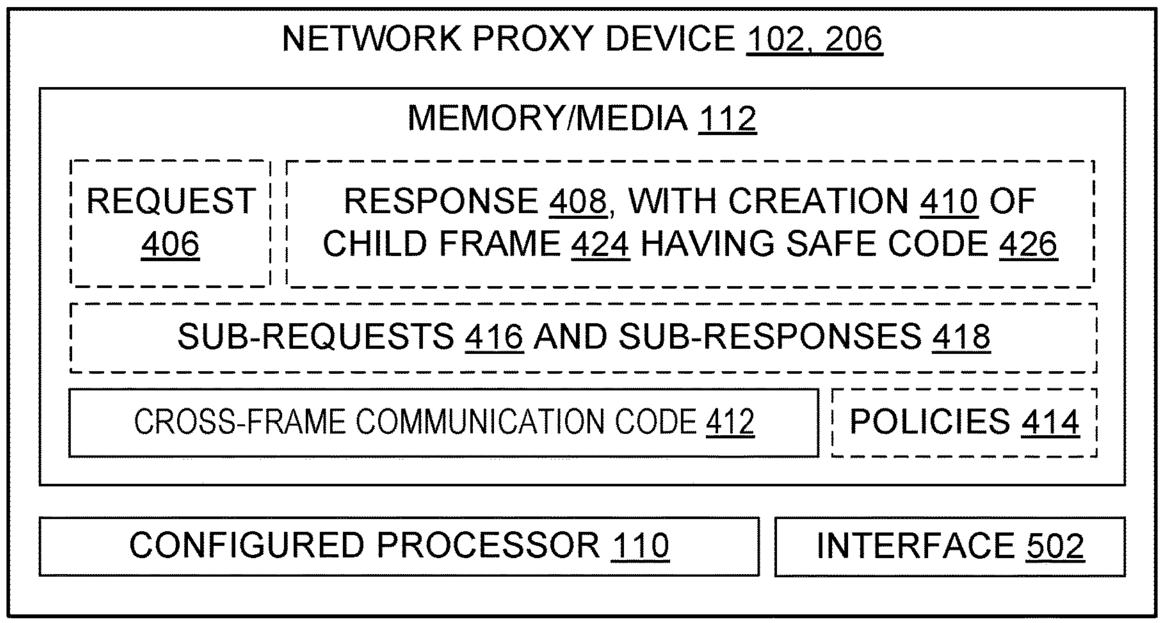
FIG. 5 is a block diagram illustrating some aspects of a proxy device.
Figure 6:
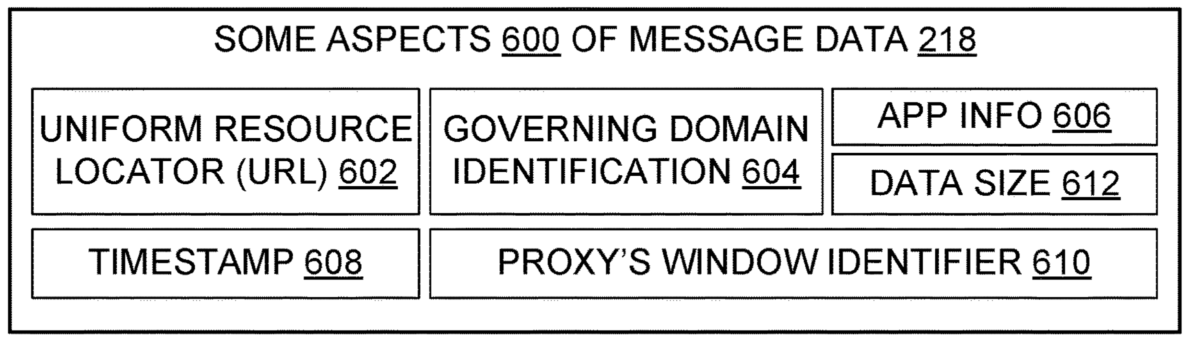
FIG. 6 is a block diagram illustrating some aspects of message data.

As to other Figures, FIG. 5 further illustrates an example proxy 206, FIG. 6 shows some aspects 600 of message data 218 which are discussed at various points throughout this disclosure, and FIG. 7 was discussed above.

Some embodiments use or provide a proxy device 206 which includes a memory 112 and a processor 110 in operable communication with the memory. The proxy device 206 is configured to facilitate secure communication between web frames. In particular, the processor is configured to perform cross-frame communication steps which include receiving from a requestor 402 a request 406 which implicates a web frame 204 of a page 212, creating a response 408 to the request, and adding a control frame creation 410 to the response. Web frames and domains are "implicated" in a request or a response if they are expressly or implicitly identified in the request or response, or if they are the source or target of the request or response. The control frame creation is configured to create a control frame child 424 of the web frame; the control frame child is configured with code 426 to set and retrieve data 218 of a browser data store 216. The cross-frame communication steps also include returning to the requestor the response including the added control frame creation, and adding control frame creations to one or more other responses to respective other requests which implicate respective other web frames, such that a plurality of web frames of the page each has a respective control frame child.

As a result of these cross-frame communication steps, the plurality of web frames of the page are configured for cross-frame communication with one another using message data that is set in the browser data store by one of the web frames and retrieved from the browser data store by another of the web frames. Security of communications between web frames of the plurality is enhanced in that each control frame child is free of any dependency on any external resource 908 and is also free of any call 910 to any external script 912.

In some embodiments, the browser data store 216 includes at least one of the following: a browser's tab-specific storage, a browser's session storage, or a browser's local storage.

In some embodiments, each control frame child has the same control frame domain name 602, and that control frame 424 domain name is different from any application 124 domain name that is received by the proxy device from the requestor.

In some embodiments, each control frame child 424 has an instance of the same control frame code 426, and that control frame code contains at most static HTML and a static script code snippet. In other embodiments, different control frames 424 have somewhat different code 426, e.g., code customize to a particular frame, but the various codes 426 are all functionally constrained as discussed herein to provide secure cross-frame communications by avoiding presentation of opportunities for unknown (and hence possibly compromised or always malicious) code to run in the page 212.

In some embodiments, the HTML control frame code 426 looks like this:

```
<html>
<head>
</head>
```

-continued

```
<body>
<script>
    function calculateTopDomain( ) {
        var domainParam = getQueryStringParam("domain");
        var parentDomain = "https://" + domainParam;
        if(getQueryStringParam('top') === "0") {
            var response =
sessionStorage.getItem("mcas_top_domain");
            parent.postMessage(JSON.stringify({"response":
response, "error": undefined}), parentDomain);
        } else {
            sessionStorage.setItem("mcas_top_domain",
parentDomain);
            parent.postMessage(JSON.stringify({"response":
parentDomain, "error": undefined}), parentDomain);
        }
    }
    calculateTopDomain( );
</script>
</body>
</html>
```

This control frame contains no outside script calls, and no outside resource dependencies. Avoiding 906 such externalities makes it difficult if not impossible for an attacker to infiltrate this code, bearing in mind that the control frame origin is only from the proxy server and is not related to the application.

The code above also provides an example of a call to window.postMessage( ), which is used to communicate from the control frame to its parent creator about the data it has in the sessionStorage 216.

The code above also illustrates use of the phrase "static HTML" to demonstrate that a very primitive, static, unchangeable code is being executed in the control frame. This provides another layer of safety and security to make it difficult or impossible for a malicious code in the DOM to interfere with the cross-frame communication process using the control frame.

As an example of a call 410 that would be made to add a control frame as a child of a frame in a DOM, at each frame load, some embodiments will create a child iframe dynamically that is the control frame, using code such as the following:

```
var controlFrame = window.document.createElement("iframe");
var topDomain = window.self === window.top ? "1" : "0";
controlFrame.src = "https://mcas-
proxyweb.us.cas.ms/controlFrame";
controlFrame.style.display = "none";
window.document.body.appendChild(controlFrame);
```

In some embodiments, every frame 204 of the page which is not a control frame has a control frame child 424. In other embodiments, some but not all (i.e., a plurality) of the page's frames are equipped to communicate with one another, and only that plurality of frames receive control frames as respective children.

In some embodiments, all communications between frames 204 of the page 212 go through the browser data store 216 and use code 426 of at least one control frame child 424. In other embodiments, conventional postMessage( ) calls without the security enhancements described herein also occur. Even a partial replacement of conventional postMessage( ) calls would be an improvement. However, in some embodiments, different inter-frame communication mechanisms than those taught here may supplement the constrained postMessage( ) calls described herein; the present teachings are not necessarily incompatible with some other approach, depending on that other approach.

In some embodiments, each control frame child 424 has a respective parent frame, and each control frame child has a parameter 422 that indicates whether that respective parent frame is a top frame of the page.

In some embodiments, the first request 406 includes a browser request to load web page content 214 to the first web frame 204. As is normal practice in patent documents, qualifiers such as "first" and "second" herein do not necessarily imply a strict time ordering but may be used instead to distinguish between instances of the same or similar items. In some embodiments, the proxy device 206 creates the first response without issuing a sub-request and getting a sub-response, and thus does not include any sub-response portion in the first response. For example, the first response may indicate an operational error code, or indicate a security-based denial of the first request.

In some embodiments, the proxy device 206 is configured for operation as a reverse proxy. However, teachings provided herein can also be beneficially employed in forward proxy operations.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific component names, optimizations, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 8 illustrates a method 800 which is an example of methods that may be performed or assisted by an enhanced system 206. The enhanced system receives 802 a request and creates 804 a response. The response may include content from a sub-response, or content from a cache, or the response may include a request denial based on a policy, or the response 408 may be a combination of the foregoing, for example. The method adds 806 the web control frame creation 410 to the response if the frame making the response is not itself a control frame and lacks a control frame child, and returns 810 the result to the requestor. The created control frame 424 can then be used 812, e.g., to ascertain a policy 414 to apply (e.g., by a lookup using the domain or its hash or other identifier as a key), to create 820 or update 820 a list of related frames 204 or frame operations (load, navigate, refresh, etc.), to calculate elapsed times such as the approximate time 324 since the first outer frame was loaded, to attribute 818 activities to applications, to initialize 824 frames, to communicate data for reporting 826, to support 828 input actions, and so on. By using constrained PostMessage( ) calls as taught herein, the embodiment reduces security risks relative to approaches that use unconstrained PostMessage( ) calls.

FIG. 9 further illustrates cross-frame communication methods (which may also be referred to as "processes" in the legal sense of that word) that are suitable for use during operation of a system 400, including some refinements, supplements, or contextual actions for steps shown in FIG. 8. Technical processes shown in the Figures or otherwise disclosed will be performed automatically, e.g., by a proxy 206, unless otherwise indicated. Processes may also be performed in part automatically and in part manually to the extent action by a human administrator or other human person is implicated, e.g., in some embodiments a person may specify policy 414 constraints, or may associate a particular policy 414 with a particular URL 602 or domain 210. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 action items or flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method performed by or with a proxy to aid securely sharing message data 218 among web frames, the method including the proxy: receiving 802 from a requestor a request which implicates a web frame of a page; creating 804 a response to the request; adding 806 a control frame creation to the response, the control frame creation configured to create a control frame child of the web frame, the control frame child configured to set 814 and retrieve 816 data of a session-specific browser data store 216; and returning 810 to the requestor the response including the added control frame creation. This method further includes adding control frame creations to one or more other responses to respective other requests which implicate respective other web frames, such that a plurality of web frames of the page each has a respective control frame child. This method is further characterized in that the plurality of web frames of the page are configured for cross-frame communication with one another using message data that is set in the session-specific browser data store by one of the web frames and retrieved from the session-specific browser data store by another of the web frames. Moreover, security of communications between web frames of the plurality is enhanced in that each control frame child is free of any dependency on any external resource and is also free of any call to any external script.

In some embodiments, the method communicates 920, 812 message data from a top frame of the page to one or more child frames of the page. In some, message data is communicated 812 from a child inner frame 204 to the outermost top frame 204. In some, message data is communicated 812 between inner frames 204.

In some embodiments, the message data is communicated 812 as part of attributing 818 activities to respective applications. In some, the message data is communicated 812 as part of 820 associating different web frames with one another as frames of the page. In some, the message data is communicated 812 as part of reporting 826 a background query from a server, reporting 826 a background query to the server, or doing both. In some, the message data is communicated 812 as part of performing asynchronous reporting 826. In some, the message data is communicated 812 as part of allowing 922 a domain of the top frame to manage 924 initialization 926 of data of the child frame. In some, the message data is communicated 812 as part of reporting 826 an error. In some, the message data is communicated 812 as part of supporting 828 a mouse movement or a keyboard press or another activity that is driven by a peripheral input. One of skill will understand that a given piece of message data or a given communication action may be part of more than one of these examples, and that a given embodiment may include zero or more of these examples.

In some embodiments, the method further includes checking 928 whether a particular frame is the top frame of the page. In some, the control frame HTML knows whether it is communicating with a top frame or communicating with a non-top frame because each frame initializes the child control frame with a Boolean parameter 422 that indicates whether it is the top frame or not. For instance, code like the following can check whether it is running in the top frame or not:

```
Var isTopFrame=(window.self===window.top);
```

In some embodiments, the method performs communications between at least two of the web frames of the plurality at least in part by setting 814 application information 606 in the session-specific browser data store 216 as message data 218, with the application information including at least one of: a server response to the top frame, or content of an address bar of the top frame.

In some embodiments, each control frame child has a respective parent frame, and the method further includes using 938 a postMessage( ) call to communicate between a particular control frame child and its parent frame about message data that is in the session-specific browser data store.

In some embodiments, the web frames of the plurality belong to a document object model 404, a system 102 containing the document object model 404 is infected by malicious code 934, and the method performs communications between at least two of the web frames of the plurality without allowing 930 interference 932 from the malicious code.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as cross-frame communication code 412, responses 408 which include control frame creation 410 code, requests 406, message data 218, control frames 424 and their code 426, and lists of related frames 204 (those in the same window 202), in the form of data 118 and instructions 116, read from a removable storage medium 114 and/or another source such as a network connection, to form a configured storage medium. The configured storage medium 112 is capable of causing a computer system 102 to perform technical process steps for secure cross-frame communication, as disclosed herein. The Figures thus help illustrate configured storage media embodiments and process (a.k.a. method) embodiments, as well as system and process embodiments. In particular, any of the process steps illustrated in FIG. 8 or 9, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause one or more devices 102 to perform a method of facilitating secure communication between web frames. This method includes: adding 806 a control frame child to each of a plurality of web frames of a page, each control frame child having an instance of the same control frame code, the control frame code configured to set and retrieve data of a browser data store; and performing 812 a cross-frame communication, said performing including one of the web frames setting 814 a message data in the browser data store and another of the web frames retrieving 816 the message data from the browser data store. Security of communications between web frames of the plurality is enhanced in that the control frame code is free of any dependency on any external resource and is also free of any call to any external script.

The browser data store 216 has a maximum storage capacity. In some embodiments, that data store capacity is the only limit on the amount of message data that can be communicated in a single pair of set 814 retrieve 816 actions. In various embodiments, for example, the message data has a size that is at least one-third, or at least half, or at least nine-tenths, the size of the maximum storage capacity.

In some embodiments, each control frame child has a respective parent frame, and the method further includes using 938 a constrained postMessage( ) call as taught herein to communicate between a particular control frame child and its parent frame about message data that is in the browser data store. In some, all communications between frames of the plurality go through the browser data store and use code of at least one control frame child.

In some embodiments, the method further includes attributing 818 activities of frames of the plurality to respective applications.

In some embodiments, the method is performed entirely within a cloud 302. In some configurations, the server and proxy are in a cloud, for example, whereas the browser is not. However, method steps may be limited to those performed by the proxy 206, and hence be entirely performed within the cloud.

Additional Examples and Observations

One of skill will recognize that not every part of this disclosure, or any particular details therein, are necessarily required to satisfy legal criteria such as enablement, written description, or best mode. Also, embodiments are not limited to the particular networks, protocols, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Another Overview of Some Embodiments. In some embodiments, an enhanced proxy monitors communications between a client browser and servers. During a session, the proxy detects requests from the client that will create a new frame, and injects a child control frame 424 creation into the response to the client. As a result, the DOM 404 is modified so that every frame of a page has a control frame as a child. This includes the top frame of the page and all child frames of the top frame (except the control frame—this is not an infinite recursion). In some embodiments, these control frames are deleted once that data 218 transfer 816 between frames is complete. This limits the amount of time the DOM contains these control frames and optimizes the browser performance while rendering the proxied app 124.

The control frame has a predetermined known domain name, e.g., "mcas-proxy.us.cas.ms", which is different than any application domain name.

The control frame HTML is unrelated to any particular application domain. In other words, the same control frame HTML 426 is used with every application 124. The control frame contains only static HTML 426 and a static non-changeable script code snippet 426. In this example, the entire and the only purpose this control frame has is to set 814 and retrieve 816 data stored in the browser's session storage 216 per that domain only. That is, if the data received to this frame is from the top domain, the control frame will set this data 218 and store it in the session storage. Alternatively, if a query is received from a non-top frame, then the control frame accesses session storage 216 and retrieves the data from it.

In this example, session storage 216 is tab-specific storage that is controlled by the client browser 200. Session storage is freed when the tab is closed or when the session otherwise ends. Session storage allows access only the specific values saved by the exact origin requesting the data. That is, if one saves {key="a", value="b"} from domain=mcas-proxyweb.us.cas.ms, then the only code able to access this data in the session storage is a code running from mcas-proxyweb.us.cas.ms.

In some embodiments, the method used to communicate the data retrieved by the controlled frame back to the querying frame is to call the window.postMessage( ) routine 322. This routine 322 provides a general way to communicate between frames that are not from the same origin. However, embodiments use this routine 322 safely and allow only specific formatted messages that originated from the control domain.

There is no particular limit on the size of the cross-frame message data 218, except whatever size limit the browser imposes on session storage 216.

Alternatively, the cross-frame message data 218 could be written to and read from browser local storage, instead of being written to and read from browser session storage.

In some embodiments, the HTML 426 that reads cross-frame message data from a top frame and writes that cross-frame message data into session storage is invoked by a postMessage( ) call from the top frame to the child control frame. In some, the HTML 426 that reads cross-frame message data from session storage and provides a copy of that cross-frame message data to a non-top frame is invoked by a postMessage( ) call from the non-top frame to the child control frame.

This communication mechanism can be more secure than conventional use of postMessage( ) for several reasons. First, in some embodiments all of the communications between frames go through the control frame 424. By contrast, conventional use of postMessage( ) allows frames to communicate directly with each other. Some embodiments allow each frame to only communicate with the control frame, which cannot be injected by a malicious script code as it is not part of the application and is not proxied. Second, in some embodiments the added child frames 424 are control frames that contain only static HTML and have strictly limited functionality (reading and writing cross-frame message data). By contrast, conventional use of postMessage( ) allows a frame to create any other frame or DOM element it wants. Third, some embodiments optimize on the time window where the DOM is changed and the cross frame communication is used, in that after the communication has ended the DOM is returned to its original state.

In order to break the security that is added by some embodiments, an attack would need to do something difficult. An attack might make unauthorized changes to the control frame, e.g., by adding JavaScript® code or by changing the control frame HTML. But this is difficult because it would require the attacker be able to respond to requests originating from mcas-proxyweb.us.cas.ms, which one may reasonably assume is only within reach of a state-sponsored or similarly resourced and persistent attacker. An attack might instead make unauthorized changes to the cross-frame message data in session storage. But this would require breaching the browser's security manifest, which one may reasonably assume is difficult to do. An attack might instead make unauthorized changes to the DOM in memory during a session. But this would require breaching the browser's security, which one may reasonably assume is difficult to do.

Embodiments herein may be used on their own, or as an additional security control. Many web application security products such as firewalls and unified threat management (UTM) appliances focus on HTTP or HTTPS traffic for detecting threats, but do not have the cross-frame communication discussed herein. Thus, some embodiments of the present teachings add a new layer of security and detect threats that bypass such security products, by monitoring page-building and navigational processes at a proxy server.

One major and effective use of some embodiments may be to attribute 818 activity to applications. This can be done by putting application info, such as server responses to the top frame and the address bar of the top frame, into the session storage as cross-frame message data, so that child frames know what application context they are running inside. However, cross-frame message data 218 can also be communicated from a top frame to child frames for other purposes, such as: reporting 826 background queries from and to the server, asynchronous insight and shared log reporting 826, allowing the top domain to manage 924 the child frame's initialization data 926, error reporting 826, or supporting 828 activities and features that benefit from or rely on frame data sharing, such as mouse movements and keyboard presses.

Some Message Data Possibilities. A web page presented to a user 104 may be built out of more than one frame 204. Conventional MITM proxy services handing out such web pages will normally treat every frame within the page separately, since each browser frame load will issue a different request to the proxy service and the conventional proxy lacks a mechanism to accurately connect these frames together based on that traffic. However, communication between these frames may be useful. For example, cross-frame communication may allow the proxy service to determine that a frame belongs to an upper page (over all window 202), and to learn information about that upper page 202.

In some scenarios, message data 218 may include the domain 210 of the top frame (which is often seen in the URL 602 that is displayed in the browser's address bar). This access to shared message data 218 can be used, for example, to determine by execution of suitable code 412 that an inner utility frame, e.g., a Microsoft Word™ Online frame, is actually contained within a governing website, e.g., a SharePoint® website (marks of Microsoft Corporation). From that, the code 412 can determine that the relevant website for applying security controls and writing into the log 308 by the proxy service 206 is the SharePoint URL, not the Word Online inner frame.

In some scenarios, message data 218 may include a timestamp 608 representing the time of loading the top frame 204. This data may be useful to code 412 in computing how long the user has spent on the page 212 without navigating to another one. In embodiments wherein the timestamp of loading the top frame is sent as message data 218 from any inner frame, the proxy server code 412 can determine the order of frame loads and can provide that information to help a developer debug the performance of the page as a whole.

In some scenarios, message data 218 may include a request identifier 610. The identifier 610 may be employed as a more granular replacement for a timestamp 608. The proxy server code 412 can generate 936 a random or pseudo-random identifier 610 for the whole page 212 or 202, and pass that as message data 218 for inner frames to identify themselves with. This way, the inner frames will send the page identifier 610 to the proxy server 206, and by examining the proxy logs 308 a developer can debug and troubleshoot proxying of a page 202 as a whole.

As another example, proxy code 412 may parse HTML code to locate a frame creation code tag, such as a tag of the form "<iframe src=https:// . . . />". In this example, the <iframe> tag will generate a frame, and src specifies the URL the browser will try to load to the frame. One of skill will understand that this is merely one example, and that teachings herein apply more broadly to other codes and other options for navigation or generation of frames, e.g., anchor.target and others.

An Outer Frame—Inner Frame Example. As another example illustrating operation and technical benefits of some embodiments, consider a scenario in which a user opens a Microsoft Office 365® Word™ Online word processing frame inside a frame that is associated with Microsoft OneDrive® storage services. To promote security through consistent application of security policies, the inner word processing frame should inherit or otherwise be governed by the outer frame's security policies 414.

In particular, assume that an admin 104 using a conventional MITM proxy has configured a "block file download" policy 414 on the OneDrive® site 210. One of the users in the organization is browsing to the OneDrive® site, and even though the browser's address bar URL says "onedrive.com" the page seen by the user is built out of multiple frames 204 with various URLs. Assume one of these frames is controlled by a Word Online™ document editor, which is on a different domain 210, namely, "office.com". Assume the user attempts to save the word processor document from within this Word Online™ frame. The MITM proxy server gets the file download request, and sees that the domain is "office.com". Since this is a conventional proxy and the "office.com" domain evidently has nothing to do with "onedrive.com" this conventional proxy server has no way to connect this request to a OneDrive® security policy, even though from the user's point of view the user was in the OneDrive® site and the security controls detailed in the OneDrive® security policy should be enforced.

In addition, a security risk exists because posting and receiving messages may well trigger the run of JavaScript® code or other script code 912 on other frames (mark of Oracle America, Inc.). Even though the code was meant to be run by remote messages, this might be an opportunity for an exploit, since the script code can be triggered externally instead of being triggered only within the frame that contains the script code.

However, if the top frame URL 602 had been shared into all the inner frames using the message data 218 sharing functionality taught herein, then a suitably enhanced proxy service 206 would have gotten the URL or domain data from the inner frame (Word Online™) indicating that its parent is a OneDrive® frame. Then proxy code 412 would have been able to connect the frames, recognize that the OneDrive® frame's policy should govern the Word Online™ frame, and block the file download.

In addition, only the necessary information (message data 218) would have been passed into or out of the frames, which avoids 906 triggering frame script code that would otherwise being triggered by sending or receiving the data by posting or getting messages. The security risk noted above, of an external page triggering script execution, is avoided.

Some PostMessage( ) Observations. Some embodiments avoid conventional use of a frame's postMessage( ) function in order to pass messages between frames. Invoking postMessage( ) functionality without adequate safeguards is problematic in a proxy because creating new DOM elements inside a page one does not control may break a web page. Using teachings provided herein permits a solution that is more secure and that need not parse any content from frames unknown to a frame that would have been a postMessage( ) target or recipient.

The functionality of postMessage( ) may be convenient for website creators. But MITM proxies benefit from increased security if they do not assist or allow unsecure postMessage( ) calls, namely, those that create events 706 or DOM elements 710 in a website when the consequences are unclear or undesirable or both. Posting a message between frames 204 will trigger any event listener 708 listening to these events along the way. This includes browser 200 extensions that might break from getting an unexpected event in an unexpected format, as well as other web frames that weren't expecting this type of event. For example, consider a plugin that adds mouse gestures into a browser by inserting frames into a page and sending and listening to messages on them. Implementing communications via postMessage( ) may break plugins like this, but passing information 218 via the control frames 424 and browser store 216 as taught herein does not.

Some Attribution Observations. As an example scenario, office productivity applications have been integrated together such that one overarching application 124 can show views of other apps inside the overarching application. When a page of an application X shows data of an application Y, a child frame of application Y does not conventionally see and know that the user is actually viewing application X (the top frame). For instance, a videoconferencing application side pane can be shown in different productivity applications (such as cloud storage and document collaboration applications. In this scenario, activity originating from the videoconferencing application frame could be translated to an activity belonging to the document collaboration application, for instance, because the user has viewed the document collaboration application.

To be more specific, because of same origin policy, each frame can only access its own properties and data that was initialized to it by the server. Therefore, a child frame does not know about data being initialized in the top frame without communication from the top frame. Some embodiments allow a proxy session to communicate message data (of any kind) from the top frame to its child frame(s). This can be used in particular to attribute 818 activities originating in a child frame, so they are recognized as belonging to their top frame's identity for policy purposes.

Safe cross frame communication between parent and child frames during a proxy session can assist attribution 818. During proxy session control, a user can perform various actions in the browser. In order to allow optimized activity control, it is helpful to attribute 818 activities to their respective applications, thus distinguishing between different apps and domains that are not part of the session proxy. Attribution 818 of an action is facilitated by an ability to understand the origin of the action and the purpose of the actual operation that took place. Toward that end, some embodiments communicate aspects of the current proxied page to child frames which do not have visibility to the entire document. As part of the Same Origin Policy that the browser applies, a frame in the document may only be exposed to data that originated from that same frame or from identical origin frames. Teachings provided herein support a solution implementing a safe cross-frame communication technique that enriches child proxied frames in the page with message data in order to report activities with their correct attributed applications. This communication technique constrains and builds on familiar cross-frame capability to ensure communication is performed in a safe and secure manner that does not reduce the proxied site's security. By leveraging the ability to control each frame, one can implement a safe communication technique that would not be possible generically in any other site that contains multiple origin frames. Normally, a client-side cross communication between a parent frame and its children will suffer potential vulnerabilities that will allow information disclosure and even code execution on cross origin frames. Embodiments taught herein use dedicated control endpoints 424 to mediate this communication and allow a safe API between frames that are not in the same origin. This communication allows correct activity attribution in sites that contain multiple apps in the same page view.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, the teachings provided herein may be applied to computing systems 102 in a cloud 302 or elsewhere, and thereby enhance cybersecurity through a combination of communication constraints. Communication between web frames 204 increases consistent application of security policies 414, without reducing security. A proxy 206 receives a first request 406 implicating a first web frame 204 and its URL 602, potentially issues a sub-request 416 and gets a sub-response 418, and creates a first response 408 to the first request, including a control frame child 424 creation 410, in frame creation or frame navigation code. The control frame child 424 code 426 only permits setting 814 and retrieving 816 cross-frame message data 218 via a browser store 216. This is done using 938 a postMessage( ) routine 322, without 906 reference to external resources 908 or external scripts 912. Safely sharing 812 message data 218 this way between frames 204 allows the proxy 206 to ascertain a policy 414 based on the shared data, so it can apply the policy in reactions to subsequent requests, and allows window frames to be associated 820 together in the proxy. Cross-frame communication also allows frame initialization 824 control, supports various kinds of reporting 826, and otherwise enhances browsing without reducing security.

Embodiments are understood to also include or benefit from tested and appropriate security controls and privacy controls such as the General Data Protection Regulation (GDPR), e.g., it is understood that appropriate measures should be taken to help prevent misuse of computing systems through the injection or activation of malware and help avoid tampering with any personal or private information the proxy server 206 may process during program execution. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A proxy device which is configured to facilitate secure communication between web frames, the proxy device comprising:

a memory;

a processor in operable communication with the memory, the processor configured to perform cross-frame communication steps which include (a) receiving from a requestor a request which implicates a web frame of a page, (b) creating a response to the request, (c) adding a control frame creation to the response, the control frame creation configured to create a control frame child of the web frame, the control frame child configured to set and retrieve data of a browser data store, (d) returning to the requestor the response including the added control frame creation, and (e) adding control frame creations to one or more other responses to respective other requests which implicate respective other web frames, such that a plurality of web frames of the page each has a respective control frame child;

whereby the plurality of web frames of the page are configured for cross-frame communication with one another using message data that is set in the browser data store by one of the web frames and retrieved from the browser data store by another of the web frames; and whereby security of communications between web frames of the plurality is enhanced in that each control frame child is free of any dependency on any external resource and is also free of any call to any external script.

2. The proxy device of claim 1, wherein the browser data store comprises at least one of the following: a browser's tab-specific storage, a browser's session storage, or a browser's local storage.

3. The proxy device of claim 1, wherein each control frame child has the same control frame domain name, and that control frame domain name is different from any application domain name that is received by the proxy device from the requestor.

4. The proxy device of claim 1, wherein each control frame child has an instance of the same control frame code, and that control frame code contains at most static HTML and a static script code snippet.

5. The proxy device of claim 1, wherein every frame of the page which is not a control frame has a control frame child.

6. The proxy device of claim 1, wherein all communications between frames of the page go through the browser data store and use code of at least one control frame child.

7. The proxy device of claim 1, wherein each control frame child has a respective parent frame, and each control frame child has a parameter that indicates whether that respective parent frame is a top frame of the page.

8. A method of facilitating secure communication between web frames, the method comprising:

receiving from a requestor a request which implicates a web frame of a page;

creating a response to the request;

adding a control frame creation to the response, the control frame creation configured to create a control frame child of the web frame, the control frame child configured to set and retrieve data of a session-specific browser data store;

returning to the requestor the response including the added control frame creation;

adding control frame creations to one or more other responses to respective other requests which implicate respective other web frames, such that a plurality of web frames of the page each has a respective control frame child;

whereby the plurality of web frames of the page are configured for cross-frame communication with one another using message data that is set in the session-specific browser data store by one of the web frames and retrieved from the session-specific browser data store by another of the web frames; and whereby security of communications between web frames of the plurality is enhanced in that each control frame child is free of any dependency on any external resource and is also free of any call to any external script.

9. The method of claim 8, wherein the method communicates message data from a top frame of the page to one or more child frames of the page.

10. The method of claim 9, wherein the message data is communicated as part of at least one of the following:

attributing activities to respective applications; or associating different web frames with one another as frames of the page.

11. The method of claim 9, wherein the message data is communicated as part of at least one of the following:

reporting a background query from a server, a background query to the server, or both;

performing asynchronous reporting;

allowing a domain of the top frame to manage initialization of data of the child frame;

reporting an error; or supporting a mouse movement or a keyboard press or another activity that is driven by a peripheral input.

12. The method of claim 9, further comprising checking whether a particular frame is the top frame of the page.

13. The method of claim 9, wherein the method performs communications between at least two of the web frames of the plurality at least in part by setting application information in the session-specific browser data store as message data, the application information including at least one of: a server response to the top frame, or content of an address bar of the top frame.

14. The method of claim 8, wherein each control frame child has a respective parent frame, and wherein the method further comprises using a postMessage( ) call to communicate between a particular control frame child and its parent frame about message data that is in the session-specific browser data store.

15. The method of claim 8, wherein the web frames of the plurality belong to a document object model, a system containing the document object model is infected by malicious code, and the method performs communications between at least two of the web frames of the plurality without allowing interference from the malicious code.

16. A computer-readable storage medium configured with data and instructions which upon execution by at least one processor cause one or more devices to perform a method of facilitating secure communication between web frames, the method comprising:

adding a control frame child to each of a plurality of web frames of a page, each control frame child having an instance of the same control frame code, the control frame code configured to set and retrieve data of a browser data store;

performing a cross-frame communication, said performing including one of the web frames setting a message data in the browser data store and another of the web frames retrieving the message data from the browser data store;

whereby security of communications between web frames of the plurality is enhanced in that the control frame code is free of any dependency on any external resource and is also free of any call to any external script.

17. The computer-readable storage medium of claim 16, wherein the browser data store has a maximum storage capacity, and the message data has a size that is at least one-third the size of the maximum storage capacity.

18. The computer-readable storage medium of claim 16, wherein each control frame child has a respective parent frame, wherein the method further comprises using a postMessage( ) call to communicate between a particular control frame child and its parent frame about message data that is in the browser data store, and wherein all communications between frames of the plurality go through the browser data store and use code of at least one control frame child.

19. The computer-readable storage medium of claim 16, wherein the method further comprises attributing activities of frames of the plurality to respective applications.

20. The computer-readable storage medium of claim 16, wherein the method is performed entirely within a cloud, or the child frames are deleted after the message data is retrieved and before the session ends, or both.

* * * * *